Nov. 6, 1934.  A. G. BUDD ET AL  1,980,034
MECHANICAL APPLIANCE FOR REMOVING FEATHERS, STUBS, AND DOWN
FROM FOWLS, GAME BIRDS, DUCKS, GEESE, OR THE LIKE
Filed March 16, 1934  3 Sheets-Sheet 3
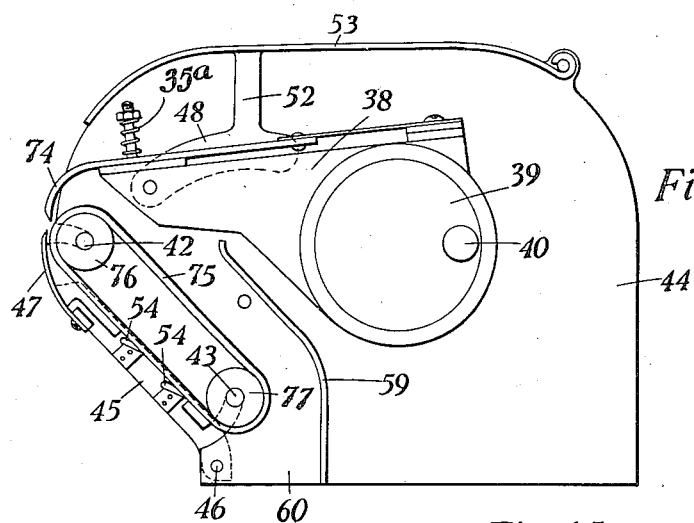
*Fig. 13.*
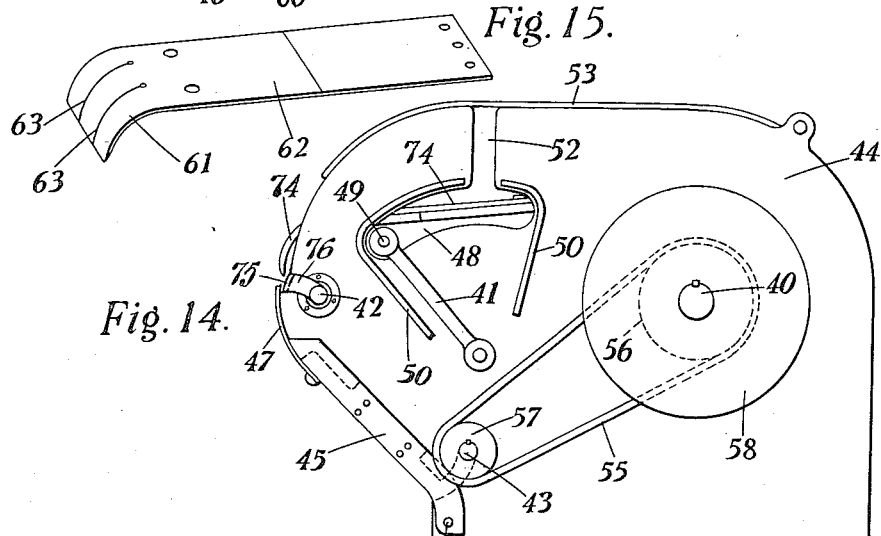
*Fig. 15.*
*Fig. 14.*
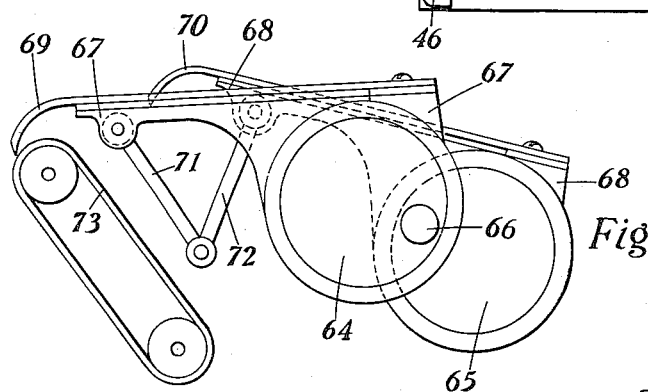
*Fig 16*
INVENTORS.
A. G. BUDD.
H. BARTON.
BY
Blair & Kilcoyne
ATTORNEYS.

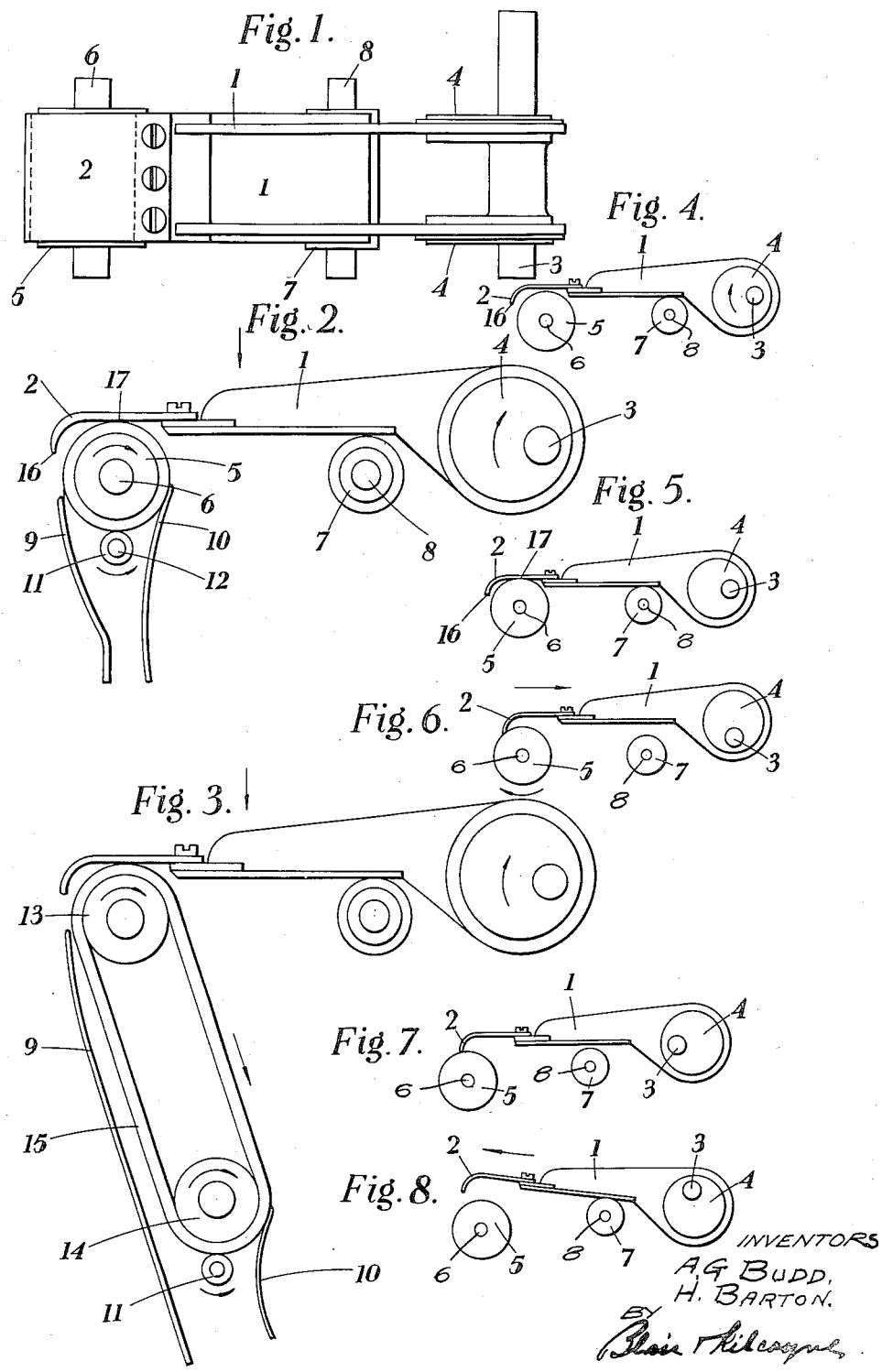

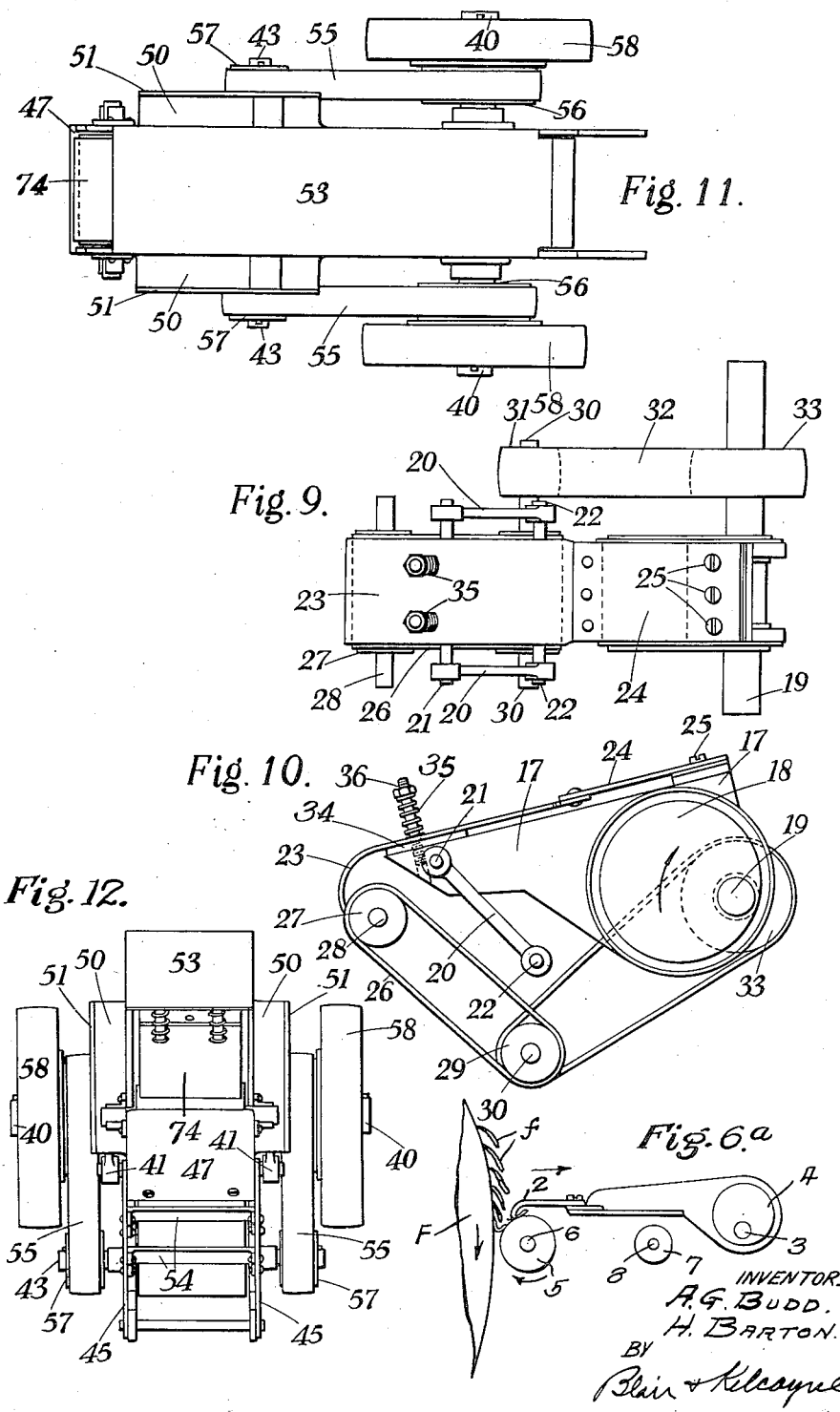

Patented Nov. 6, 1934

1,980,034

UNITED STATES PATENT OFFICE 1,980,034

MECHANICAL APPLIANCE FOR REMOVING FEATHERS, STUBS, AND DOWN FROM FOWLS, GAME-BIRDS, DUCKS, GEESE, OR THE LIKE

Anthony George Budd and Henry Barton, West Moors, Dorset, England

Application March 16, 1934, Serial No. 715,982
In Great Britain March 14, 1933

16 Claims. (Cl. 17—11)

This invention relates to improvements in or relating to plucking devices and more particularly though not necessarily exclusively to means for removing feathers, stubs and down from poultry and other birds and has for its object to provide simple and efficient means for performing plucking operations.

According to the present invention we provide a plucking machine including one or more gripping elements cooperating with one or more abutments and means whereby said element or elements may be caused to move in a direction towards and away from said abutment or abutments and also be caused to move at right angles to said direction, whereby the matter to be plucked may be gripped when said element or elements approaches or approach the associated abutment or abutments and may be extracted during the subsequent movement.

The aforesaid abutment, or each of them in cases wherein more than one is provided, is preferably in the form of a roller, endless band or the like and such roller, endless band or the like may be freely mounted so that it may be caused to move when the cooperating gripping element tends to slide over its surface or said part may be continuously driven during operation of the machine.

The aforesaid gripping element, or each of them in cases wherein more than one is provided, is preferably of a resilient nature and may for example be in the form of or be carried by a spring-like blade. Said blade or its supporting member may be constrained to move in the desired path in any convenient manner. Thus for instance said blade may be constrained by any suitable guideways or the like and movement may be imparted thereto by means of a rocker-arm, crank, eccentric or the like driven by hand or by any suitable motor. In a further arrangement said blade may be moved at one end by means of a rocker-arm, crank, eccentric or the like and the movement so imparted may be modified in order to achieve the desired resultant movement by means of one or more links or the like also connected to said blade or its carrier, or by means of one or more stops, guides or the like located in the path of said blade.

It is of course desirable for the gripper element or elements to contact tightly with the associated abutment or abutments in order securely to grip the matter to be plucked and the desired pressure at the area or areas of contact may be attained by reason of a combination of the natural flexibility of the gripper and the movement imparted thereto and/or by means of subsidiary springs or other means.

Any desired means may be provided for clearing from the plucking machine the plucked matter or liquids produced therefrom. Thus for example in cases wherein movable rollers, bands or the like form the abutments cooperating with the gripping elements, one or more scrapers, rollers or the like may be located adjacent to said rollers, bands or the like so as to contact with the surfaces thereof.

The aforesaid scrapers or like cleaning means are preferably mounted on a plate or carrier detachable from the machine so that any collected matter may be easily removed when desired.

A guard is preferably provided below the plucking aperture of the machine and such guard may include a relatively sharp upper edge in order to cause short feathers, stubs or the like to project into positions for being easily gripped.

The aforesaid gripping blade preferably includes an end portion turned towards the cooperating abutment so that when said parts are together the contact area is relatively narrow, so ensuring adequate intensity of gripping pressure but at the same time avoiding cutting or breaking the matter to be plucked.

A machine according to this invention may include a single gripping blade so formed that the plucking aperture is defined at one side by a continuous edge of said gripper or the gripper may be slotted so as in effect to present a series of gripping edges. In some cases the latter arrangement may be preferable as it would enable the various sections to adapt themselves to various thicknesses of the matter to be plucked. In a further arrangement we may provide a plurality of gripping elements each of which may include a continuous or interrupted plucking edge and said gripping elements may be so actuated that the several gripping cycles take place simultaneously or in any desired sequence. It may in some cases be desirable to arrange the grippers to operate in sequence as in this way it is possible to reduce the length of the line of matter which is plucked at each plucking cycle, so reducing the possibility of damaging the flesh of the bird and at the same time avoiding any reduction in the speed at which the matter is plucked.

The aforesaid roller, band or the like adapted to form an abutment for the gripper is preferably exposed just below the plucking aperture so that matter to be plucked may be rested thereagainst. In this way movements of said roller, band or the like may be utilized for urging said matter into proper positions for being effectively gripped. Said roller, band or the like is moreover, preferably so mounted that it can be easily removed for cleaning purposes.

A machine according to this invention may be enclosed within a suitable casing and any desired cowling or the like may be employed for protecting the parts and ensuring that a bird to be plucked will be held in proper position with respect to the plucking aperture.

A machine according to this invention may include any desired suction fan or the like for inducing the matter to be plucked to pass between the gripper jaws and/or for conveying the plucked matter to a discharge chute or the like.

The plucking machine may be mounted on a suitable bed plate or the like or it may be of a portable nature suitable for being held in the hand during plucking operations and in the latter cases we preferably employ flexible means for driving the gripper or grippers.

In order that our invention may be well understood we will now describe by way of example some embodiments thereof with reference to the accompanying drawings in which:—

Figure 1 is a diagrammatic plan view of one form of plucking device,

Figure 2 is a side elevation of the device shown in Figure 1,

Figure 3 is a side elevation of a modification of the device shown in Figure 2 and showing one method of conveying the plucked matter to any desired discharge point.

Figures 4, 5, 6, 7 and 8 are side elevations of the gripper elements in various stages in their cycle of operations with Fig. 6a being a diagrammatic illustration of a portion of a fowl whose feathers, stubs, or the like are being plucked, with the gripper elements being shown in the stage illustrated in Fig. 6, Figure 9 shows diagrammatically a plan view of the operating parts of a modified form of plucking device, Figure 10 is a side elevation of the device shown in Figure 9, Figure 11 shows a practical form of machine in plan view, Figure 12 is an end elevation of the machine shown in Figure 11, Figure 13 is a side elevation of said machine with one side plate removed to show essential parts, Figure 14 is a side elevation of the machine with a link housing cover plate removed to expose part of the mechanism operating the plucking blade, Figure 15 is a perspective view of a modified form of plucking blade and, Figure 16 shows diagrammatically an arrangement including two plucking blades.

Referring more particularly to Figures 1 and 2, plucking jaws are formed by a blade 2 cooperating with a roller 5, said blade being carried on an arm 1. One end of said arm 1 makes engagement with an eccentric 4 mounted on a shaft 3. During operation of the machine said shaft 3 is rotated in the direction of the arrow appearing in Figure 2, thereby imparting a reciprocating movement to said arm 1.

The end of the aforesaid blade 2 is down turned at its end 16 in the manner shown in the drawings so that it presents a relatively narrow area of contact with the roller 5.

The aforesaid roller 5 is rotatably mounted on a spindle 6 so that it may be caused to rotate when the plucking blade 2 is drawn thereover and the surface of said roller is maintained in a clean condition by a resilient scraper blade 10 contacting with the periphery thereof. If desired, one or more rollers preferably urged resiliently towards the roller 5, such as the roller 11 rotatably mounted on the spindle 12, may be provided in addition to or in lieu of the scraper 10.

A roller 7 rotatably mounted on a spindle 8 is located under the arm 1 in such position that the blade 2 is constrained to move towards and away from the roller 5 during its reciprocation and so effect opening and closing movements of the jaw formed by said members 2 and 5.

The arm 1 is in this example spring loaded in the direction of the arrow appearing above Figure 2 so that the blade 2 always tends to move towards the roller 5.

A guard 9 is located in front of the machine and is preferably so located as to form a rest for ensuring the proper positioning of the bird to be plucked. The upper edge of said guard is preferably relatively sharp so as to provide a scraper which may be employed for causing the matter to be plucked to project from the bird.

Figure 3 of the drawings shows a modification in which in place of a single roller 5 serving as an abutment cooperating with the blade 2, a flexible band 15 passing over two rollers 13 and 14 is employed. This band may be made of rubber or other suitable material and may serve as a conveyor for carrying away the plucked matter to any desired discharge point or any desired bagging or grading apparatus. Said band may of course pass over any desired guiding pulleys in order to convey the plucked matter to the desired point.

The aforesaid conveyor band 15 is preferably driven continuously during operation of the machine and not only enables the plucked matter to be conveyed away but also tends to feed the matter to be plucked into proper positions between the gripping members.

The upper gripping element in Figure 3 is identical with that shown in Figure 2 and the various parts are represented by similar reference numerals and similar subsidiary devices such as the guard 9 and clearing means 10 and 11 are also shown in Figure 3.

Now referring to Figures 4 to 8 the cycle through which the plucking arm, i. e., the upper gripping member passes during one revolution of the driving shaft will be clearly seen.

Figure 4 shows the condition in which the blade 2 is in its fully advanced condition and the flat portion of said blade is maintained just clear of the roller 5 by reason of the roller 7 supporting the arm 1. When the shaft 3 turns through a very small angle into the position shown in Figure 5 the rear part of the arm 1 is lifted thereby allowing the body of the blade 2 to rest on any feathers or the like located between said blade and roller. Continued rotation of the shaft 3 will draw the blade 2 over the roller 5 so drawing inwardly any matter trapped under the downturned portion 16 of the blade and causing the roller 5 to rotate thereby assisting the proper positioning of the matter to be plucked. The matter is not however pinched at this stage and it is important that the roller 7 be so positioned as to prevent the blade 2 from contacting with the roller 5 when the eccentric passes its forward dead centre and the arm 1 rapidly descends as any severe blow on the matter to be plucked would probably break or cut it. Further rotation of the shaft 3 will gradually close the gap between the end 16 of the blade 2 and the roller 5 until such time as the top of the part 16 engages the roller 5. When the shaft 3 has been turned through 90° from the position shown in Figure 4, the condition shown in Figure 6 is attained, i. e., the blade 2 has passed through approximately one half of its rearward stroke, the matter between the blade 2 and roller 5 is securely gripped both by reason of the relatively narrow end of the curved portion 16 localizing the pressure with which the blade 2 is urged downwardly and by reason of the tension in said springs being increased as the blade 2 is urged upwardly when the tip 16 passes over the surface of the roller 5. The actual gripping action takes place just prior to the parts adopting the position shown in Figure 6 and in that position the matter will be partially extracted.

When the shaft has turned through 90° from the position in Figure 6, the position shown in Figure 7 is reached, that is, the tip 16 of the blade 2 is on the crest of the roller 5 and the arm 1 has reached the rearward limit of its movement and extracted the matter gripped between the gripping elements. Continued rotation of the shaft 3 lowers the rear end of the arm 1 until said arm engages the roller 7 whereupon the front end of the arm 1 is lifted away from the roller 5 and the plucked matter is released. Figure 8 shows the position of the parts when the eccentric 4 is on its bottom dead centre, that is the gripping jaw is opened to its maximum extent. During the next quarter of a revolution of the shaft 3, the blade 2 advances and descends so imprisoning more matter to be plucked and again reaching the position shown in Figure 4. If desired a resilient or other suitable covering may be applied to the blade 2 at the part marked 17, i. e., the part which may strike the matter to be plucked when said blade descends, in order to avoid any possibility of damaging said matter.

Figure 6a is diagrammatically illustrative of the plucking operation and shows a small portion of the fowl F with a line of feathers, stubs, or like material f to be plucked above the roller 5, the gripping elements being in the stage illustrated in Figure 6 as previously described. The fowl F is passed downwards, and the blade 2 on its return journey to the plucking position comes down between the flesh of the fowl and the matter to be plucked which has been turned upwards by reason of its contacting with the upwardly revolving roller 5. As the eccentric 4 carrying the blade 2 continues to revolve, the blade is drawn back tightly on to the roller and imprisons the matter to be plucked between itself and the roller. Further movement of the blade 2 causes the plucking action to take place as illustrated. The movement of the blade is purposely arranged so that its plucking edge comes down in advance of the roller because if it were to come down on the surface of the roller, the matter to be plucked, which was already positioned on the roller, would in all probability be cut or broken.

Now referring to Figures 9 and 10, certain modifications are shown although the movement of the plucking blade is substantially similar to that of the blade shown in the previous figures. In the present example however the path of the arm carrying said blade is positively defined at all parts. Thus said arm indicated by numeral 17 is constrained at one end by the eccentric 18 mounted on the driving shaft 19 and at the other end by the links 20 pivoted to a spindle 21 passing through said arm and to points of anchorage 22 located on any convenient part of the machine.

The plucking blade 23 is in this example of a flexible nature or is flexibly mounted. Thus for instance it may be secured to a flexible extension 24 secured to the arm 17 at the points 25. In this way the arm 17 is not constrained to move when the curved extremity of the blade encounters the cooperating abutment formed by the conveyor 26 at the point where it passes over the roller 27. Said roller is mounted on a spindle 28 and the band 26 is supported at its lower end by a second roller 29 keyed to a spindle 30. A belt pulley 31 is keyed to the spindle 30 and a belt 32 passes over this pulley and over a driving pulley 33 keyed to the driving shaft 19. Obviously many other forms of drive could be adopted in order to cause movement of the conveyor 26. Thus for example chains or gearing may be employed in lieu of belts. It is found however that the continuous feeding of the conveyor band at a suitable speed facilitates the clearing of the plucked matter and the operation of properly positioning the matter to be plucked.

In the device shown in Figures 9 and 10, there is no necessity to provide a subsidiary stop for limiting the movement of the arm 17, the necessary relative movement between the gripping members being attained by the resiliency of the blade 23 and/or by the resiliency of its mounting. The machine is therefore very silent in operation and any clatter which may be produced by the blade 23 striking the forward end of the arm 17 may be damped out by means of a pad 34 of rubber or other suitable material.

The blade 23 may be urged downwardly solely by reason of its flexibility and/or its flexible mounting or subsidiary springs may be employed if desired. Thus for example compression springs 35 may abut against the blade 23 and be threaded over studs 36 secured to the arm 17. Screwed nuts may be fitted to the ends of these studs in order to make provision for adjusting the tension in the springs.

In a modification of the embodiment shown in Figures 9 and 10, the plucking blade may be urged towards its cooperating abutment solely by means of the springs 35 and in a further embodiment the spindle 21 instead of being restrained by means of links 20 may be caused to move in the desired path by suitably shaped guideways.

Figures 11 to 14 show a complete machine in a practical form. The gripper jaws are formed in the same manner as is illustrated in Figures 9 and 10, that is to say they are formed by a plucking blade 74 cooperating with an endless band 75 passing over rollers 76, 77. The blade 74 is, as before, flexibly mounted on an arm 38 driven by an eccentric 39 mounted on a driving shaft 40 and the forward end of said arm is constrained in its movement by links 41. Springs 35a are also provided for urging the blade 74 downwardly towards the arm 38. The spindles 42, 43, carrying the rollers 76, 77, respectively are carried in slots formed in the side plates 44, 44 of the casing of the machine so that the conveyor assembly can be easily withdrawn for cleaning purposes.

To the front of the machine is fitted a guard assembly 45 hinged at 46 to the bottom of the casing so that it may be easily turned when it is desired to clean the machine.

A blade 47 projects from the top of said guard assembly and defines the lower limit of the plucking aperture of the machine. The edge of this blade is preferably sharpened so that it acts as an efficient scraper for causing the matter to be plucked to project from the bird and the lower portion serves as a guard against which the bird may be rested.

Arcuate slots 48 are cut in the side plates of the machine for accommodating the movements of the spindle 49 connecting together the links 41 and arm 38, and said links are housed within parts 50, 50 of the casing. Said parts 50, 50 are provided with removable cover plates (not shown) so that ready access may be had to said links. Slots 52 lead from the slots 48 to the top of the machine so that after removal of the links 41 the plucking arm assembly may be easily turned about the eccentric 39 and be lifted above the machine for cleaning or other operations.

The top of the machine is covered by a top cowling 53 which may be detachably or hingedly secured to the frame of the machine and the back of the machine is also enclosed.

The aforesaid guard 45 carries two or more knife like blades 54 inclined in a direction opposite to that in which the conveyor band 75 travels and so mounted that their edges scrape said band and keep its surface clean. Said band is driven from the main shaft 40 by means of a belt 55 passing over a pulley 56 secured to said shaft 40 and a pulley 57 secured to the spindle 43. Said belt drive is duplicated, i. e. a drive is located on each side of the machine as is seen in Figures 11 and 12 so as to maintain proper balance of the machine and two fly-wheels 58, 58 are also preferably mounted on the driving shaft 40, such wheels being for example in the form of belt pulleys for connection with any suitable driving motor.

A baffle 59 (Figure 13) is located between the conveyor band 75 and the eccentric 39, so forming a throat 60 through which the plucked matter is discharged. The outlet from said throat may overhang a bench on which the machine may be mounted or may communicate with a discharge chute or the like.

Figure 15 shows another form of plucking blade. In this case the down-turned end 61 of the blade 62 is slotted at 63, 63, so as to form three resilient fingers capable of independent movements. This arrangement is in some cases desirable as it more readily accommodates a group of feathers of irregular thickness.

Figure 16 shows diagrammatically how two plucking blades may be operated. In this case two eccentrics, 64, 65 spaced at 180 degrees are mounted on the driving shaft 66 and each of these eccentrics carries a plucking arm 67, 68 and associated plucking blade 69, 70 respectively. The forward ends of said arms are restrained by means of links 71, 72 in the manner hereinbefore described and both plucking blades cooperate with a single conveyor 73.

Whilst we have hereinbefore described some embodiments of our invention we wish it to be understood that various modifications may be made without departing from the scope thereof. Thus for example any desired number of plucking blades may be provided and the apparatus may be of any desired dimensions and made from any suitable material. Moreover the machines may be hand driven or any desired electric or other form of motor may be employed.

We claim:

1. A plucking machine including gripper jaws comprising movable gripping means and a complementary abutment, said abutment comprising a roller and an endless band on said roller, means for causing said gripping means to move in a direction towards and away from the periphery of said band and also to move at right angles to said direction and means for driving said endless band so that it feeds the matter to be plucked to said gripper jaws and conveys the plucked matter away therefrom.

2. A plucking machine including gripper jaws comprising movable gripping means and a complementary abutment, said abutment comprising a roller and an endless band on said roller, means for causing said gripping means to move in a direction towards and away from the periphery of said band and also to move at right angles to said direction, means for driving said endless band so that it feeds the matter to be plucked into a position between the gripper jaws and also feeds the plucked matter away therefrom, and means contacting with said endless band for maintaining the surface thereof in a clean condition.

3. A plucking machine including gripper jaws comprising a resilient blade and cooperating roller, means for causing said blade to move in a direction towards and away from said roller in order to cause opening and shutting of the jaws and means for causing said plate to move toward and circumferentially with respect to said roller in order to extract the matter gripped in said jaws and to return the blade to its gripping position.

4. A plucking machine including gripper jaws formed by a resilient blade and a cooperating roller, an arm carrying said blade, an eccentric connected to said arm, driving means for causing rotation of said eccentric whereby one end of said arm follows the path of said eccentric, a stationary part and a link having one end pivoted to the stationary part and the other end pivoted to said arm for modifying the movement of the free end of the latter so that it moves with a combined rocking and reciprocating movement.

5. A plucking machine including gripper jaws formed by a resilient blade and a cooperating roller, an arm carrying said blade, an eccentric connected to one end of said arm, means for rotating said eccentric and causing reciprocation of the connected end of the arm, a stationary part, a link having one end pivoted to said stationary part and the other end pivoted to an intermediate part of said arm whereby the free end of said arm is caused to oscillate in a vertical plane during the aforesaid reciprocatory motion, and resilient means for adjustably urging said blade towards said roller when the arm is in its lowermost position.

6. A plucking machine including gripper jaws formed by a resilient plucking blade and a cooperating roller, an endless band passing over said roller and over a driving roller, an arm carrying said plucking blade, an eccentric connected to one end of said arm, means for rotating said eccentric and causing reciprocation of the connected end of the arm, a stationary part, a link having one end pivoted to the stationary part and the other end pivoted to an intermediate part of said arm whereby the free end of said arm, that is, the part cooperating with the endless band on said roller to form the gripper jaws, is caused to oscillate in a vertical plane during its reciprocatory movement and one or more adjustable springs for urging the forward part of the resilient plucking blade towards its carrying arm whereby when said blade has reached its limit downward movement and the arm is caused further to descend a spring-like grip results between said plucking blade and the co-operating endless band.

7. A plucking machine as claimed in claim 6 in which said endless band serves the function of a conveyor for carrying the plucked matter away from the gripper jaws and scrapers in contact with the band for maintaining the surface of said band in a clean condition.

8. A plucking machine including gripper jaws formed by a resilient plucking blade and a co-operating abutment, an arm carrying said blade, an eccentric connected to one end of said arm, means for rotating said eccentric and thereby causing reciprocation of said arm and blade and a roller located under an intermediate part of said arm in such a position that it causes the plucking blade to move upwardly from the abutment forming a component of the gripping jaws during that part of the cycle in which the plucking blade advances but allows said blade to contact with said abutment during that part of the cycle in which the plucking blade is retracted, that is, during the actual plucking or extracting operation.

9. A plucking machine including gripper jaws comprising movable gripping means and a complementary abutment, said abutment having a part movable in a curved path, and means whereby said gripping means may be moved in a direction towards and away from the periphery of said abutment for the purpose of gripping the matter to be plucked and subsequently freeing the plucked matter and also be moved in a plane at right angles to a plane forming a tangent to the curved path, for the purpose of plucking any matter gripped between said gripping means and abutment.

10. A plucking machine including gripper jaws comprising movable gripping means and a complementary abutment in the form of a roller, means for causing said gripping means to move towards and away from said roller and also to move in a direction at right angles to said direction, said means for imparting movement to said gripping means comprising an eccentric cooperating with one end of the gripping means in combination with means constraining the other end of said gripping means to rock.

11. A plucking machine including gripper jaws comprising movable gripping means and a complementary abutment in the form of a roller, actuating means for causing said gripping means to move towards and away from said roller, and also to move in a direction at right angles to said direction, said actuating means comprising an eccentric cooperating with one end of the gripping means in combination with a link pivoted to said gripping means and to a point stationary with respect thereto.

12. A plucking machine including gripper jaws comprising a movable gripping blade and a roller constituting a complementary abutment and resilient means for causing said blade to move in a direction towards said roller in order to yieldably grip matter located therebetween and also to move at right angles to said direction in order to extract said gripped matter and then return to a gripping position.

13. A plucking machine including gripper jaws comprising a movable gripping blade and a roller constituting a complementary abutment, means for causing said blade to move in a direction towards said roller in order to grip matter located therebetween and also to move at right angles to said direction in order to extract said gripped matter and then return to a gripping position, and adjustable springs for controlling the pressure of the blade on the roller when the parts are in their gripping position.

14. A plucking machine including gripper jaws comprising a movable gripping blade and a roller constituting a complementary abutment, driving means for causing said gripping blade to move in a direction towards and away from said roller in order to grip the matter located therebetween and also to move at right angles to said direction and to the axis of said roller in order to extract the gripped matter and then return to the plucking position, said gripping blade and roller forming a plucking aperture, and a guard located below said aperture in order to form a rest for the object to be plucked and to protect the hands of the operator, said guard including a sharp upper edge forming a scraper for causing the matter to be plucked to become erected.

15. A plucking machine including gripper jaws comprising a resilient blade and a cooperating roller, the operative end of said blade being slotted so as to present a plurality of gripping edges capable of undergoing independent movements, means for causing said slotted blade to move towards and away from said roller in order to cause shutting and opening of said jaws and means for causing said blade to move toward and circumferentially with respect to said roller in order to extract the matter gripped in said jaws and to return the blade to its gripping position.

16. A plucking machine including gripper jaws comprising a resilient plucking blade and a co-operating roller, means for causing said blade to move in a direction towards and away from said roller in order to cause shutting and opening of the jaws, means for causing said blade to move in a direction at right angles to said first named direction whereby to extract the matter gripped in said jaws and to return the blade to its gripping position, means for causing the matter to be plucked to enter between the gripping jaws and for conveying away the released matter, and a guard located adjacent to the gripping jaws.

ANTHONY GEORGE BUDD.
HENRY BARTON.